Figure 2:
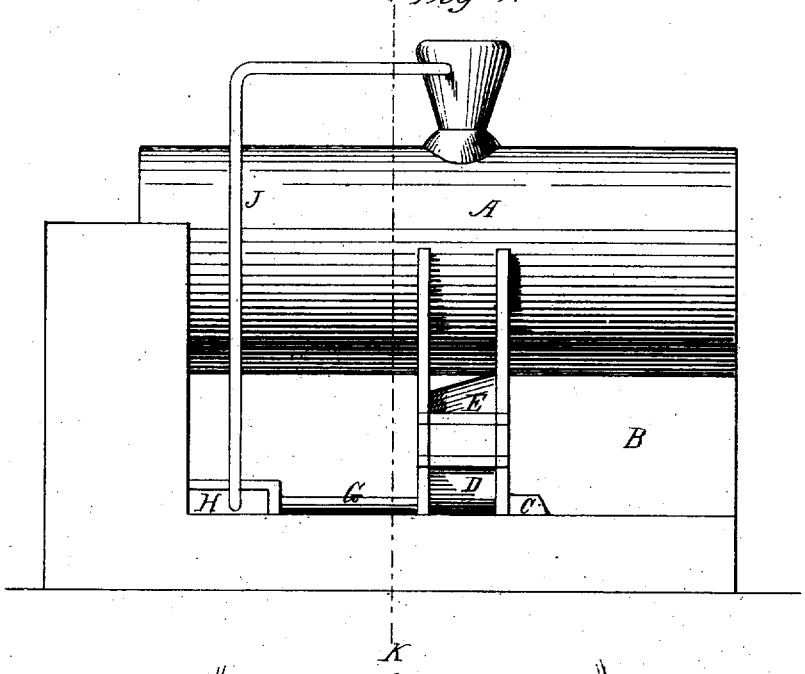

2 Sheets--Sheet 1.
S. A. FORD.
Smoke Burning Furnace.
No. 6,666.
Reissued Sept. 28, 1875.
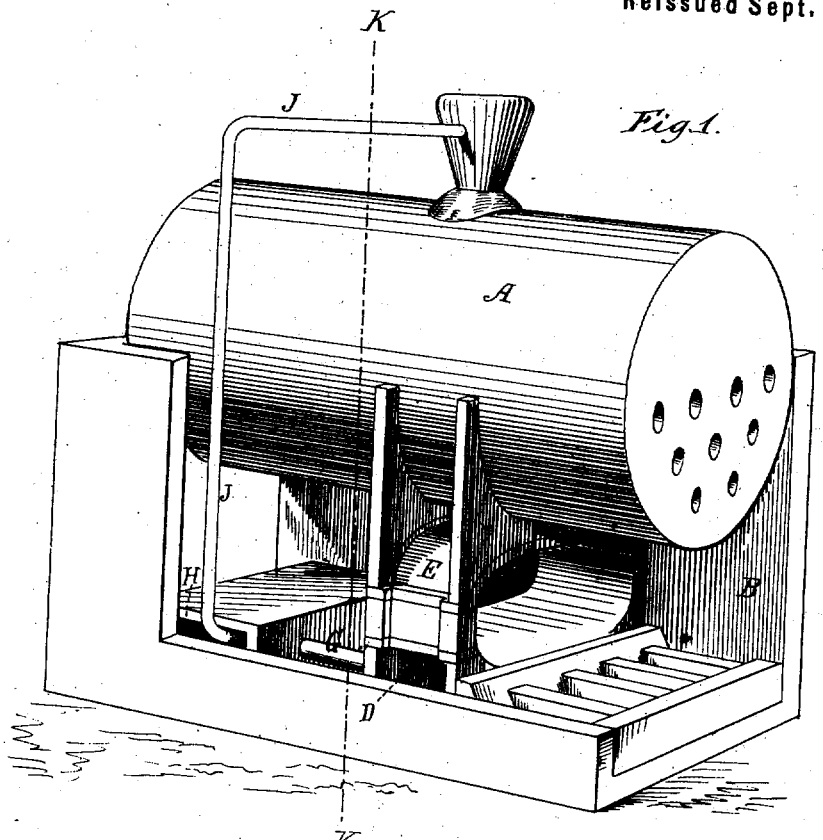
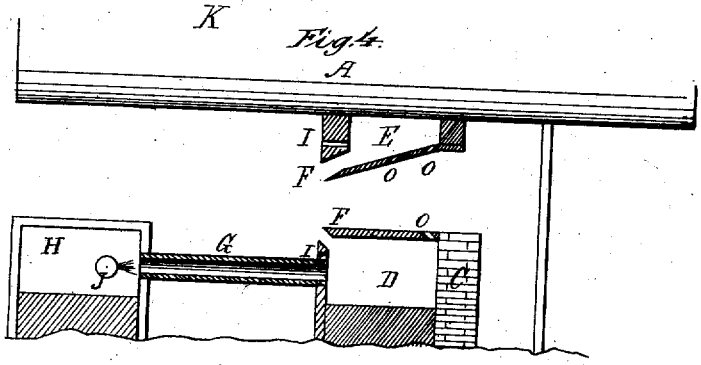
Witnesses
A. Moore
W. T. Hutchinson
Inventor
Samuel A. Ford
by Munson & Philipp attys
N. PETERS, PHOTO-LITHOGRAPHER, WASHINGTON, D. C.

2 Sheets--Sheet 2.

S. A. FORD.

Smoke Burning Furnace.

No. 6,666. Reissued Sept. 28, 1875.

Witnesses
A. Moore
W. T. Hutchinson

Inventor
Samuel A Ford
by Munson & Philipp attys

N. PETERS, PHOTO-LITHOGRAPHER, WASHINGTON, D. C.

UNITED STATES PATENT OFFICE

SAMUEL A. FORD, OF CHICAGO, ILLINOIS.

IMPROVEMENT IN SMOKE-BURNING FURNACES.

Specification forming part of Letters Patent No. 143,004, dated September 23, 1873; reissue No. 5,999, dated August 4, 1874; reissue No. 6,666, dated September 28, 1875; application filed September 15, 1875.

*To all whom it may concern:*

Be it known that I, SAMUEL A. FORD, of the city of Chicago, county of Cook and State of Illinois, have invented a new and useful Improvement in Smoke-Burning Furnaces, of which the following is a specification:

My invention is especially adapted for use in connection with steam-boilers and heating-furnaces; but I shall more particularly describe its application to steam-boilers, it being observed that in the case of heating-furnaces the top wall of the furnace corresponds to the bottom of the boiler, as herein described and referred to.

The object of my invention is to provide a cheap and efficient method of promoting the combustion of volatile hydrocarbon and other gases, which, in passing off as smoke, occasion great loss of heat, and consequent waste of fuel.

To accomplish this purpose I construct, in the following manner, chambers for heating and distributing air, and intimately mingling the same with the gases at the point where the highest temperature, and hence the greatest expansion, of the gases is usually obtained. The space immediately in the rear of the bridge-wall, in general use, is bricked up as far as may be desirable or required, for the purpose of constructing within this brick-work, or when the space is limited, in part, within it, and in part within the bridge-wall, an air-chamber of sufficient capacity, the size of the same being, in all cases, governed by the size of the boiler, and the quantity of coal to be consumed per hour. The top of this brick-work is either on a line with the top of the bridge-wall, or in some cases dropped a little below it. At a convenient distance in the rear of this air-chamber a similar but usually smaller air-chamber is constructed, parallel with the same, and connected therewith by means of pipes, or, when the same is more convenient, by means of continuous brick-work, having one or more flues constructed within it, the air in its passage through these pipes or flues being heated to the desired temperature.

Immediately under and dependent from the bottom of the boiler, and over the bridge-wall and air-chamber first mentioned, there is also constructed another air-chamber, by means of a hollow arch or hollow arches, which is connected with the one beneath it by means of passages or spaces at the ends of the arch or arches.

This upper air-chamber is deflected, so as to make the space between the top of the arch or arches, and the bottom of the boiler at the rear end of the chamber larger than at the front. These air-chambers may be constructed of any material capable of resisting a high temperature.

A small jet of steam is taken by means of a suitable pipe from the dome of the boiler, and may be introduced into either of the two lower air-chambers; but the mode of using the same which I have shown in the drawings forming a part of this specification I have found the most effective, for, by means of openings in the steam-pipe opposite each pipe or passage connecting the rear air-chamber with the one in front of it, the supply of air is readily controlled, and thereby, also, any defect in the natural draft is entirely obviated. In situations where the natural draft is very strong the steam-jet may be dispensed with.

Figure 3:
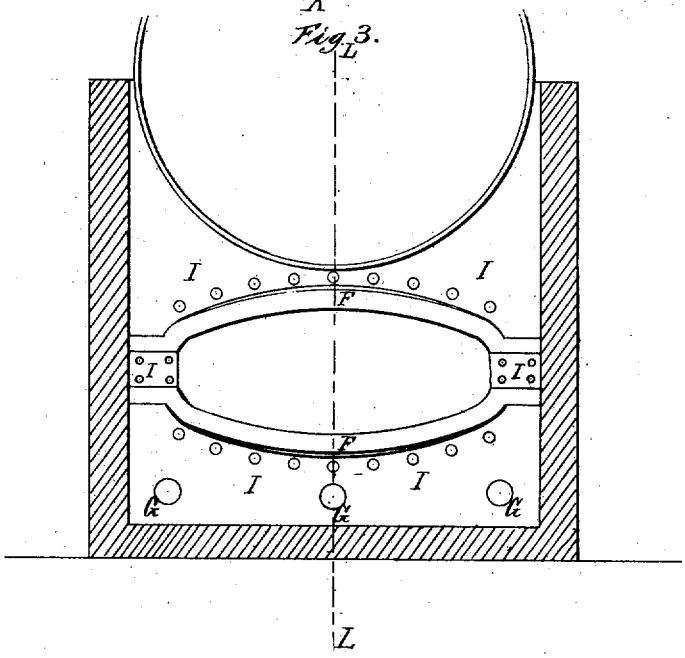

In the accompanying drawings, Figure 1 is a perspective view, one side of the furnace-wall being removed to show the grate, fire-box, bridge-wall, and air-chambers. Fig. 2 is a side elevation with furnace-wall removed. Fig. 3 is a transverse vertical section on line K K of Figs. 1 and 2. Fig. 4 is a vertical longitudinal section on line L L of Fig. 3.

A represents an ordinary boiler; B, the fire-box; C, the bridge-wall; D, E, and H, the air-chambers; G, the pipes or passages connecting the two lower air-chambers together, and for heating the air; I I I, small orifices for minutely distributing the air; F F, a narrow opening lengthwise of the air-chambers E and D for a similar purpose; and O O O, small openings through the upper walls of D and lower wall of E for the same purpose. J is the steam-pipe.

The operation of my invention is as follows: The fire having been built in the fire-box B in the ordinary manner, the air-chambers and their connections are soon sufficiently heated to employ them for the purpose had in view with effect. Air is then admitted in any des'red quantity through the walls of the boiler s·tting into the air-chamber H, the air being, during its passage through this air-chamber and through the pipes G, or corresponding flue or flues constructed in the brick-work and into the air-chamber D, heated to the same, or nearly the same, temperature as the gases, and is mingled with the gases by passing out through the openings F F and the small orifices I I I and O O O.

The openings F F and orifices O O O may be constructed on an angle, as shown in the drawings, for the purpose of bringing the currents of air from the upper chamber E and the lower chamber D together at a common center line within a reasonable space, thereby effecting a perfect, or nearly perfect, commingling of the air and the gases, and hence producing a more perfect combustion.

The advantages of locating the chamber H in rear of the chamber D are, that the rear portion or flame-chamber maintains a higher heat than the furnace proper. It is also more uniform, as the addition of fresh fuel does not affect it as much as the furnace, and it prevents a clogging by reason of drawing in ashes, as it would if the air were taken from the ash-pit, and that it in no way interferes with the proper operation of the furnace, as it does not interrupt or impede the air in its passage to or through the grate, nor take away any air which should be allowed to go to the first combustion, it being important that the furnace or fire-box combustion should be as nearly perfect as possible.

The number, size, and angle of the orifices I I I and O O O may be increased or diminished, according to the size of the boiler and the amount of coal consumed.

What I claim, and desire to secure by Letters Patent, is—

1. The combination of the primary air-heating chamber or reservoir H and air-distributing chamber D with connecting-pipes, substantially as shown and described.

2. The combination of the air-chambers H and D with connecting-pipes, and the steam-pipe J, substantially as shown and described.

3. The combination of the air-chambers H and D, their connecting-pipes, and the upper air-chamber E, substantially as shown and described.

4. The combination of the air-chambers H and D, their connecting-pipes, the air-chamber E, and the steam-pipe J, substantially as shown and described.

5. The tapering air-chamber E, forming a funnel-shaped passage, the lower and back wall of said chamber being perforated, in combination with a furnace, constructed substantially as described, and in the manner specified.

SAMUEL A. FORD.

Witnesses:

SAML. I. POPE,

CHAS. H. PATTEN.